United States Patent [19]

Völker et al.

[11] Patent Number: 5,026,815
[45] Date of Patent: Jun. 25, 1991

[54] CHAIN-LENGTHENING AGENTS FOR P-PHENYLENE-METHYLENEDIISOCYANATE-PREPOLYMERS FOR CAST POLYURETHANE ELASTOMERS

[75] Inventors: Theodor Völker, Reinach; Hans Althaus, Glis; Andreas Schmidt, Reinach, all of Switzerland

[73] Assignee: Lonza Ltd., Gampel/Valais, Switzerland

[21] Appl. No.: 493,748

[22] Filed: Mar. 15, 1990

[30] Foreign Application Priority Data

Mar. 17, 1989 [CH] Switzerland ............... 1002/89

[51] Int. Cl.$^5$ ............................. C08G 18/10
[52] U.S. Cl. ............... 528/64; 564/331; 564/335; 264/328.1; 528/62; 528/60; 521/159
[58] Field of Search ............... 528/64, 61, 63, 62, 528/60; 564/331, 335; 264/328.1; 521/159

[56] References Cited

U.S. PATENT DOCUMENTS

| | | | |
|---|---|---|---|
| 3,203,932 | 8/1965 | Frisch | 528/55 |
| 3,322,810 | 5/1967 | Olin | 42/87 |
| 3,427,282 | 2/1969 | Sundholm | 528/124 |
| 3,428,610 | 2/1969 | Klebert | 528/903 |
| 3,804,806 | 4/1974 | Grivas | 28/99 |
| 3,857,890 | 12/1974 | Recchia et al. | 564/330 |
| 4,327,204 | 4/1982 | Oyaizu et al. | 528/64 |
| 4,469,653 | 9/1984 | Nissen | 528/53 |
| 4,595,742 | 6/1986 | Nalepa et al. | 264/328.1 |
| 4,810,769 | 3/1989 | Casey et al. | 528/64 |
| 4,950,792 | 8/1990 | Althaus et al. | 564/335 |

FOREIGN PATENT DOCUMENTS

| | | |
|---|---|---|
| 714092 | 7/1965 | Canada . |
| 88667 | 9/1983 | European Pat. Off. . |
| 0171588 | 6/1985 | European Pat. Off. . |
| 0220641 | 6/1987 | European Pat. Off. . |
| 2239237 | 2/1974 | Fed. Rep. of Germany . |
| 3126435 | 6/1983 | Fed. Rep. of Germany . |
| 2054814 | 5/1970 | France . |

Primary Examiner—John Kight, III
Assistant Examiner—Duc Truong
Attorney, Agent, or Firm—Fisher, Christen & Sabol

[57] ABSTRACT

Chain-lengthening agents based on chlorinated 4,4'-methylenebisanilines for p-phenylene-methylenediisocyanate prepolymer are used for the preparation of cast polyurethane elastomers.

9 Claims, No Drawings

CHAIN-LENGTHENING AGENTS FOR P-PHENYLENE-METHYLENEDIISOCYANATE-PREPOLYMERS FOR CAST POLYURETHANE ELASTOMERS

BACKGROUND OF THE INVENTION

1. Field Of The Invention

The invention, relates to new meta-chlorinated methylenebisanilines as chain-lengthening agents for MDI-prepolymers and especially for greatly-stressed cast polyurethane elastomers.

2. Background Art

Cast polyurethane (PU) elastomers belong to the "engineering" materials, whose properties can be changed in a wide range by varying the structural elements isocyanate, polyol and chain-lengthening agents. The toxicity of the educts has a special aspect in this class of plastic. As far as feasible in accordance with properties, an attempt is made to get away from the known isocyanate TDI (toluylene diisocyanate) because of its volatility and toxicity (maximum allowable concentration is 0.02 ppm), and from standard chain-lengthening agent MBOCA (4,4'-methylenebis(o-chloroaniline)) because of its proven mutagenic properties.

The tendency, therefore, is to substitute toluylenediisocyanate with p-phenylene-methylenediisocyanate (MDI), as well as mutagenic chain-lengthening agent, without drawbacks having to be accepted in the polyurethane (PU) elastomer properties. The incompatibility of 4,4'-methylenebis(o-chloroaniline) with p-phenylenemethylenediisocyanate prepolymers (yieldspartially inhomogeneous and opaque materials) supports the demand for a suitable substitute. Therefore, as great a hardness as possible, as great an offset yield stress (E modulus) as possible, and as a good tear propagation resistance (structural strength) at 20° C, especially at 60° C., are required for greatly stressed cast polyurethane elastomers on a p-phenylene-methylenediisocyanate prepolymer base.

It is known to use 1,4-butanediol as chain-lengthening agents for polyurethane elastomers on a p-phenylenemethylenediisocyanate prepolymer base (e.g., *Becker Braun L Kunststoff Handbuch*, 2d edition, Volume 7, Polyurethane, pp. 31 tf.). But polyurethane elastomers produced on this basis cannot meet the exacting requirements for heat resistance.

From European Published Patent Application No. 0220641, it is known to use 4,4'-methylenebis(meta-chloro-2,6-dialkyl)-anilines or 4,4'-methylenebis(2,5-dichloro-6-alkyl)-anilines as chain-lengthening agents in p-phenylene-methylenediisocyanate prepolymers. Actually, good polyurethane elastomer properties relative to hardness and stiffness are attainable, but because of the pot life in the second range the processing times are too short for cast polyurethane elastomers.

BROAD DESCRIPTION OF THE INVENTION

The object of the invention is to provide a chain-lengthening lengthening agent for the p-phenylene-methylenediisocyanate prepolymers, especially for greatly-stressed cast polyurethane elastomers, that does not exhibit the above-mentioned drawbacks.

The object of the invention is surprisingly achieved by the discovery of new chain-lengthening agents of the invention.

The chain-lengthening agents according to the invention contain:
(a) 1 to 70 percent by weight of 4,4'-methylenebis(2,3-dichloro-6-ethylaniline),
(b) 0 to 70 percent by weight of 4,4'-methylenebis(2,5-dichloro-6-ethylaniline),
(c) 0.1 to 15 percent by weight of 4,4'-methylenebis(3-chloro-2,6-diethylaniline), as well as
(d) 30 to 60 percent by weight of 2',3, 3',6-tetrachloro-2,6'-diethyl-4,4'-methylenedianiline, 3,3',6-trichloro-2,2',6-triethyl-4,4'-methylenedianiline and 2',3, 3'-trichloro-2,6,6'-triethyl-4,4'-methylenedianiline as a mixture, or
(e) 30 to 48 percent by weight of 2'3,3'-trichloro-2,6,6'-triethyl-4,4'-methylenedianiline above.

The chain lengthening agents of the invention preferably contain:
(a) 5 to 45 percent by weight of 4,4'-methylenebis(2,3-dichloro-6-ethylaniline),
(b) 0 to 45 percent by weight of 4,4'-methylenebis(2,5-dichloro-6-ethylaniline),
(c) 0.1 to 15 percent by weight of 2',3,3',6-tetrachloro-2,6'-diethyl-4,4'-methylenedianiline, 3,3',6'-trichloro-2,2',6-triethyl-4,4'-methylenedianiline and 2',3,3'-trichloro-2,6,6'-triethyl-4,4'-methylenedianiline as a mixture, or 30 to 48 percent by weight of 2'3,3'-trichloro-2,6,6'-triethyl-4,4'-methylenedianiline above.

The melting point of the chain-lengthening agents to the invention advantageously is not over 140° C., especially preferably not over 120° C., so that a problem-free processing is assured without taking special precautionary measures.

Since the experts thus far have held the view that with mixtures of chain-lengthening agents, poor polyurethane elastomer properties, above all in reference to the temperature stability, are to be expected because of the disturbance of the structure of the hard phase, the solution according to the invention is especially surprising. The production of the chain-lengthening agents according to the invention takes place in a known way, e.g., according to European Published Patent Application 0171588 by condensation of the corresponding anilines: 2,3-dichloro-6-ethylaniline, 2,5-dichloro-6-ethylaniline and 3-chloro-2,6-diethylaniline with formaldehyde in an acid medium.

With the composition of the chain-lengthening agents according to the invention being identical, they are used for the condensation:
2,3-dichloro-6-ethylaniline in an amount from 1 to 84 percent by weight,
2,5-dichloro-6-ethylaniline in an amount from 0 to 85 percent by weight, and
3-chloro-2,6-diethylaniline in an amount from 3 to 40 percent by weight.

The physical properties of the end product of the polyurethane elastomer change in accordance with the variable composition of the chain-lengthening agents. Therefore, another aspect of the invention is that polyurethane elastomers can be produced geared to the use.

The application of the chain-lengthening agents according to the invention takes places with current MDI prepolymers, suitably based on polyhydroxy compound, such as polyesterpolyols, polycaprolactones or polyetherpolyols which exhibit an isocyanate content from 3 to 15 percent, preferably from 5 to 10 percent.

The usual catalysts, such as tetrabutanediamine (TMBDA), diazobicylooctane (DABCO), phenylmercury propionate and also dibutyltin dilaurate (DBTC), or combinations of them, as well as other additives, such as softeners, foaming agents or fireproofing agents, can also be used in the preparation of the cast polyurethane elastomers. But preferably the operation is performed without catalyst additives which in view of the —in part— high toxicity and poor environment compatibility of the catalysts is another substantial advantage.

Suitably the chain-lengthening agents according to the invention in amounts from 0.9 to 1.1 mol, preferably in amounts from 0.95 to 1.05 mol, per mole of the NCO groups are worked into the prepolymer reaction system.

The resultant cast polyurethane elastomers are marked to a special extent by their great hardness and stiffness as well as by their structural strength in a wide temperature range, so that these products are exceptionally suitable for wear-resistant applications of hard rubber in e.g., greatly stressed parts of mining machines as surface protection or also as coatings of pipelines, and rollers (e.g., rollers for paper production, roller and polyurethane tires).

DETAILED DESCRIPTION OF THE INVENTION

The following examples and comparison tests explain the invention:

Survey Of The Anilines Used For The Condensation a) 2,3-dichloro-6-ethylaniline
b) 2,5-dichloro-6-ethylaniline
c) 3-chloro-2,6-diethylaniline

TABLE 1

| Example No. | a % Weight | b % Weight | c % Weight |
|---|---|---|---|
| 1 | 45.9 | 48.6 | 5.5 |
| 2 | 14.7 | 81.7 | 3.6 |
| 3 | 38.6 | 56.4 | 5.0 |
| 4 | 53.2 | 40.8 | 6.0 |
| 5 | 61.5 | 32.1 | 6.4 |
| 6 | 68.8 | 24.3 | 6.9 |
| 7 | 78.0 | 14.6 | 7.4 |
| 8 | 65.0 | 0 | 35 |

Survey Of The Components Of the Chain-Lengthening Agents Tested

A) 4,4'-methylenebis(2,3-dichloro-6-ethylaniline)
B) 4,4'-methylenebis(2,5-dichloro-6-ethylaniline)
C) 4,4'-mathylenebis(3-chloro-2,6-diethylaniline)
D) 2',3,3',6-tetrachloro-2,6'-diethyl-4,4'-methylenedianiline
E) 3,3',6'-trichloro-2,2',6-triethyl-4,4'-methylenedianiline
F) 2'3,3'-trichloro-2,6,6'-triethyl-4,4'-methylenedianiline

TABLE 2

| Example No. | A % Weight | B % Weight | C % Weight | D + E + F % Weight | Mp, °C. | Remark |
|---|---|---|---|---|---|---|
| 1 | 21.1 | 23.6 | 3.0 | 52.3 | 84°-91° | Invention |
| 2 | 2.2 | 66.7 | 0.13 | 31.0 | 114°-135° | Invention |
| 3 | 14.9 | 31.8 | 0.25 | 53.0 | 98°-99.1° | Invention |
| 4 | 28.3 | 16.6 | 0.36 | 54.7 | 83°-111° | Invention |
| 5 | 37.8 | 10.3 | 0.41 | 51.5 | 89°-120° | Invention |
| 6 | 47.3 | 5.9 | 0.48 | 46.3 | 108°-132° | Invention |
| 7 | 60.8 | 2.1 | 0.55 | 36.6 | 123°-130° | Invention |
| 8 | 42.3 | 0 | 12.25 | 45.5 (only F) | 102°-112° | Invention |
| I | 4,4'-methylenebis(2-chloroaniline) MBOCA | | | | 108°-111° | Comparison |
| II | 1,4-butanediol | | | | 16° | Comparison |

For testing the chain-lengthening agents, prepolymers based on polycaprolactone (CAPA) with a molecular weight of about 2000, of polytetramethyleneglycol (PTMG) with a molecular weight of 1000 and 2000 with methylenebisphenylisocyanate (MDI) were produced in the standard way (e.g., according to European Published Patent Application 0220641). The prepolymer based on CAPA contained 6.5 percent of free NCO groups. The prepolymer based on PTMG 1000 contained 9.8 to 10.1 percent of free NCO groups. The prepolymer based on PTMG 2000 contained 8.4 percent of free NCO groups.

To produce the test piece, the chain-lengthening agents according to the invention, and the comparison substance 4,4-methylenebis(o-chloroaniline) in molar stoichiometric ratio (NCO groups to the sum of free $NH_2$ group 1:1), were mixed directly with the prepolymers at 60° C. for 10 to 15 seconds and finally cast into a mold heated to 100°. If the test piece is produced with butanediol (comparison example II), it is necessary to work with a catalyst additive, preferably with phenylmercury propionate or dibenzyltin dilaurate.

The pot life was determined by measuring the period after the casting into the mold until the polyurethane mixture on an immersed spatula moved evenly horizontal draws threads. In intervals of 2 to 5 minutes, the condition of setting was studied by penetration of a fingernail into the cast test piece. If no more penetration was detectable, the time was measured and noted as "nail (demolding) time".

The test pieces were cut out from the set polyurethane, and subjected to the following physical tests:

| | |
|---|---|
| Shore hardness D (H) | according to DIN 53505 or shore hardness corresponding to ASTM-D: 2240 or 1706. |
| Structural strength (SF) | according to DIN 53515 in N/mm. |
| Tensile strength (ZF) | tensile strength in $N/mm^2$ according to DIN 53455. |
| (TZ) | pot life. |
| (NZ) | demolding time. |
| Tensile stress (TS) | tensile stress in $N/mm^2$ according to DIN 53455. |

TABLE 3

Results with Prepolymer Polycaprolactone (CAPA)

| Examples | TZ H | NZ (min) | SF N/mm 60° C. | SF N/mm 20° C. | TS N/mm2 3% | TS N/mm2 100% | ZF N/mm2 | Aspect | Remarks |
|---|---|---|---|---|---|---|---|---|---|
| 1 | 53 | 75 | 52 | 60° | 63° | 5.5 | 12.3 | 40.0 | Transparent tough | invention |
| 2 | 52 | 130 | 40 | 67° | 87° | 3.3 | 14.7 | 39.9 | Transparent tough | invention |
| 3 | 53 | 135 | 36 | 72° | 86° | 3.5 | 14.3 | 34.1 | Transparent tough | invention |
| 4 | 53 | 130 | 28 | 72° | 87° | 3.7 | 15.0 | 33.8 | Transparent tough | invention |
| 5 | 53 | 145 | 25 | 82° | 93° | 3.4 | 14.4 | 36.0 | Transparent tough | invention |
| 6 | 54 | 180 | 50 | 62° | 88° | 6.9 | 13.3 | 37.4 | Transparent tough | invention |
| 7 | 54 | 180 | 60 | 66° | 77° | 6.9 | 12.5 | 33.6 | Transparent tough | invention |
| 8 | 55 | 35 | 38 | 69° | 78° | 6.2 | 13.4 | 32.9 | Transparent tough | invention |
| I | 68 | 45 | 9 | 91° | 98° | 13.4 | 17.7 | 19.9 | inhomogeneous brittle | comparison |
| II¹ | 40 | 180 | 30 | 47° | 79° | 2.3 | 9.5 | 35.1 | cloudy, soft | comparison |
| II² | 44 | 35 | 9 | 53° | 81° | 1.9 | 9.2 | 22.4 | cloudy, soft | comparison |

Notes:
¹Phenylmercury propionate
²Dibutyltin dilaurate

TABLE 4

Results with Prepolymer Polytetramethyleneglycol PTMG 1000

| Examples | TZ H | NZ (s) | SF N/mm 60° C. | SF N/mm 20° C. | TS N/mm2 3% | TS N/mm2 100% | ZF N/mm2 | Aspect | Remarks |
|---|---|---|---|---|---|---|---|---|---|
| 1 | 71 | 120 | 25 | 70° | 108° | 21.2 | 32.2 | 42.7 | transparent hard | invention |
| I | 68 | 25 | 5 | 113° | 92° | 14.0 | 20.1 | 27.8 | inhomogeneous brittle | comparison |
| II¹ | 45 | 25 | 3 | 38° | 84° | 1.9 | 10.5 | 25.1 | cloudy, soft | comparison |
| II² | 42 | 210 | 16 | 40° | 87° | 2.6 | 11.7 | 34.1 | cloudy, soft | comparison |

Notes:
¹Dibutyltin dilaurate
²Phenylmercury propionate

TABLE 5

Results with Prepolymer Polytetramethyleneglycol PTMG 2000

| Examples | TZ H | NZ (s) | SF N/mm 60° C. | SF N/mm 20° C. | TS N/mm2 3% | TS N/mm2 100% | ZF N/mm2 | Aspect | Remarks |
|---|---|---|---|---|---|---|---|---|---|
| 1 | 60 | 140 | 12 | 57° | 70° | 11.5 | 18.2 | 35.6 | transparent hard | invention |
| I | 64 | 35 | 9 | 66° | 71° | 11.4 | 16.8 | 22.5 | inhomogeneous brittle | comparison |
| II¹ | 43 | 25 | 11 | 44° | 79° | 2.1 | 9.0 | 28.0 | cloudy, soft | comparison |
| II² | 45 | 120 | 23 | 36° | 82° | 2.5 | 16.4 | 20.5 | cloudy, soft | comparison |

Notes:
¹Dibutyltin dilaurate
²Phenylmercury propionate

What is claimed is:

1. A chain-lengthening agent based on chlorinated 4,4'-methylenebisanilines for p-phenylenemethylenediisocyanate prepolymers for cast polyurethane elastomers, containing:
   (a) 1 to 70 percent by weight of 4,4'-methylenebis (2,3-dichloro-6-ethyl-aniline),
   (b) 0 to 70 percent by weight of 4,4'-methylenebis(2,5-dichloro-6-ethyl-aniline),
   (c) 0.1 to 15 percent by weight of 4,4'-methylenebis(3-chloro-2,6-diethyl-aniline), plus
   (d) 30 to 60 percent by weight of 2'3,3',6-tetrachloro-2,6'-diethyl-4,4'-methylenedianiline and 3,3',6-trichloro-2,2'6-triethyl-4,4'-methylenedianiline and 2', 3,3'-trichloro-2,6,6'-triethyl-4,4'-methylenedianiline as a mixture, or
   (e) 30 to 48 percent by weight of 2',3,3'-trichloro-2,6,6'-triethyl-4,4'-methylenedianiline alone.

2. The chain-lengthening agent according to claim 1 containing:
   (a) 5 to 45 percent by weight of 4,4'-methylenebis(2,3-dichloro-6-ethylaniline),
   (b) 0 to 45 percent by weight of 4,4'-methylenebis(2,5-dichloro-6-ethylaniline),
   (c) 0.1 to 15 percent by weight of 4,4'-methylenebis(3-chloro-2,6-diethylaniline), plus
   (d) 30 to 60 percent by weight of 2',3,3',6-tetrachloro-2,6'-diethyl-4,4'-methylenedianiline and 3,3',6'-trichloro-2,2',6-triethyl-4,4'-methylenedianiline and 2',3,3'-trichloro-2,6,6'-triethyl-4,4'-methylenedianilineas a mixture or
   (e) 30 to 48 percent by weight of the last-mentioned compound alone.

3. The chain-lengthening agent according to claim 1 wherein the melting point of the chain-lengthening agent does not exceed 140° C.

4. The chain-lengthening agent according to claim 2 wherein the melting point of the chain-lengthening agent does not exceed 140° C.

5. Polyurethane elastomer containing a chain-lengthening agent according to claim 1.

6. The chain-lengthening agent according to claim 1 wherein the chain-lengthening agent is (e) 30 to 48 percent by weight of 2',3,3'-trichloro-2,6,6'-triethyl-4,4'-methylenedianiline alone.

7. The chain-lengthening agent according to claim 1 wherein the chain-lengthening agent is (d) 30 to 60 percent by weight of 2',3.3',6-tetrachloro-2,6'-diethyl-4,4'-methylenedianiline and 3,3',6-trichloro-2,2',6-triethyl-4,4-methylenedianiline and 2',3,3'-trichloro-2,6.,6'-triethyl-4,4'-methylenedianiline as a mixture.

8. The chain-lengthening agent according to claim 2 wherein the chain-lengthening agent is (e) 30 to 48 percent by weight of 2',3,3'-trichloro-2,6,6'-triethyl-4,4'-methylenedianiline alone.

9. The chain-lengthening agent according to claim 2 wherein the chain-lengthening agent is (d) 30 to 60 percent by weight of 2'3,3',6-tetrachloro-2,6'-diethyl-4,4'-methylenedianiline and 3,3',6-trichloro-2,2',6-triethyl-4,4'-methylenedianiline and 2', 3,3'-trichloro-2,6,6'-triethyl-4,4'-methylenedianiline as a mixture.

* * * * *